United States Patent
Nishio

(10) Patent No.: US 11,433,623 B2
(45) Date of Patent: Sep. 6, 2022

(54) RUBBER SHEET MEMBER JOINING DEVICE AND METHOD

(71) Applicant: The Yokohama Rubber Co., LTD., Tokyo (JP)

(72) Inventor: Satoru Nishio, Shinshiro (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 6 days.

(21) Appl. No.: 17/251,678

(22) PCT Filed: Mar. 29, 2019

(86) PCT No.: PCT/JP2019/014108
§ 371 (c)(1),
(2) Date: Dec. 11, 2020

(87) PCT Pub. No.: WO2019/239681
PCT Pub. Date: Dec. 19, 2019

(65) Prior Publication Data
US 2021/0276275 A1 Sep. 9, 2021

(30) Foreign Application Priority Data
Jun. 11, 2018 (JP) .............................. JP2018-111367

(51) Int. Cl.
*B29C 65/00* (2006.01)
*B29D 30/52* (2006.01)
*B29D 30/72* (2006.01)

(52) U.S. Cl.
CPC .......... *B29C 66/92* (2013.01); *B29C 66/1142* (2013.01); *B29C 66/954* (2013.01);
(Continued)

(58) Field of Classification Search
CPC ... B29C 66/1142; B29C 66/92; B29C 66/654; B29C 66/97; B29C 66/974; B29D 30/52; B29D 30/72
See application file for complete search history.

(56) References Cited

U.S. PATENT DOCUMENTS 3,935,056 A * 1/1976 Koyama ............. B29C 66/1142
156/73.6
4,765,862 A 8/1988 Azuma
(Continued)

FOREIGN PATENT DOCUMENTS

| JP | S52-107078 | 9/1977 |
| JP | S55-091650 | 7/1980 |

(Continued)

OTHER PUBLICATIONS

Translation of JP2014231204A, Keisuke Tominaga, Publication date Dec. 11, 2014 (Year: 2014).*

(Continued)

*Primary Examiner* — George R Koch
(74) *Attorney, Agent, or Firm* — Thorpe North & Western

(57) ABSTRACT

Provided are a rubber sheet member joining device and method. At least one opposing surface of a pair of gripping parts is provided with a contact member having a contact surface projecting toward an other opposing surface of the pair of gripping parts; the pair of gripping parts grip ranges in proximity to end surfaces in a state in which end surfaces project from the one opposing surface toward the other opposing surface; the total of end surface projection amounts of the end surfaces from the opposing surfaces is set to be a predetermined length larger than a separation distance between the opposing surfaces when the contact member is sandwiched between the opposing surfaces; and by bringing the contact member into a state of being sandwiched between the opposing surfaces, the movement (Continued)

of the gripping parts in proximity to each other is stopped and the end surfaces are joined together.

11 Claims, 10 Drawing Sheets

(52) U.S. Cl.
CPC .............. *B29C 66/97* (2013.01); *B29D 30/52* (2013.01); *B29D 30/72* (2013.01)

(56) References Cited

U.S. PATENT DOCUMENTS

| | | |
|---|---|---|
| 5,571,371 A | 11/1996 | Senbokuya |
| 2015/0336346 A1 | 11/2015 | Neubauer et al. |
| 2017/0239901 A1 | 8/2017 | Nijland |

FOREIGN PATENT DOCUMENTS

| | | |
|---|---|---|
| JP | S58-107323 | 6/1983 |
| JP | H07-004884 | 1/1995 |
| JP | H07-276505 | 10/1995 |
| JP | 2014-231204 | 12/2014 |
| WO | WO 2016/032322 | 3/2016 |

OTHER PUBLICATIONS

International Search Report for International Application No. PCT/JP2019/014108 dated for Jul. 2, 2019, 4 pages, Japan.

\* cited by examiner ial cross-sectional view, gripping parts of an embodi-
RUBBER SHEET MEMBER JOINING DEVICE AND METHOD This application is a 371 of PCT/JP2019/014108, filing date Mar. 29, 2019.

TECHNICAL FIELD

The present technology relates to a rubber sheet member joining device and method and more particularly, relates to a rubber sheet member joining device and method capable of accurately and quickly positioning end surfaces of unvulcanized rubber sheet members at predetermined positions and efficiently joining them.

BACKGROUND ART

In the manufacturing process of rubber products such as tires and the like, various unvulcanized rubber sheet members composed of only unvulcanized rubber or unvulcanized rubber and a reinforcing material embedded in the unvulcanized rubber are used. These rubber sheet members are formed into a member having a predetermined shape by joining the end surfaces to each other as necessary.

Various devices and methods for joining end surfaces of unvulcanized rubber sheet members have been proposed (see, for example, Japan Examined Patent Publication No. H07-004884). In the joining device of Japan Examined Patent Publication No. H07-004884, the end portions of band-like members to be joined are gripped by gripping claws, and by moving the gripping claws so as to be in close proximity to each other and so that the recesses and protrusions interlock with each other, the gripped end portions of the band-like members are joined by coming in contact with each other. In this joining step, the movements must be controlled so that the recesses and protrusions do not interfere with each other, so it is difficult to increase the speed at which the respective gripping claws (or in other words, the end surfaces of the band-like members to be joined) are brought close to each other. In addition, there is also a problem in that the interference of the interlocking recesses and protrusions directly leads to damage. Therefore, there is room for improvement in joining the end surfaces of the rubber sheet members more efficiently.

SUMMARY

The present technology provides a rubber sheet member joining device and method capable of accurately and quickly positioning end surfaces of unvulcanized rubber sheet members at predetermined positions and efficiently joining them.

A rubber sheet member joining device according to the present technology includes:

a pair of gripping parts for gripping, respectively, ranges in proximity to end surfaces of rubber sheet members to be joined, the rubber sheet members being unvulcanized;

a drive unit that moves at least one of the pair of gripping parts in a direction approaching or separating from each other; and a control unit for controlling operation of the pair of gripping parts and operation of the drive unit, the rubber sheet member joining device being configured such that:

at least one opposing surface of the pair of gripping parts includes a contact member with a contact surface projecting toward an other opposing surface of the pair of gripping parts;

when the pair of gripping parts are in close proximity to each other, the contact member is in a state of being sandwiched between the opposing surfaces, and movement of the pair of gripping parts in proximity to each other is stopped;

the ranges in proximity to the rubber sheet members are gripped, respectively, in a state in which the end surfaces project from the one opposing surface toward the other opposing surface of the pair of gripping parts, respectively; and a total end surface projection amount of the end surfaces from the opposing surfaces, respectively, is set to be larger by a predetermined length than a separation distance between the opposing surfaces when the contact member is in a state being sandwiched between the opposing surfaces and movement in proximity to each other is stopped.

The method for joining a rubber sheet member according to an embodiment of the present technology is a rubber member joining method for joining end surfaces of rubber sheet members by gripping, respectively, ranges in proximity to end surfaces of the rubber sheet members to be joined by a pair of gripping parts, the rubber sheet members being unvulcanized, and by moving at least one of the pair of gripping parts in a direction approaching each other;

the rubber member joining method including steps of:

installing a contact member having a contact surface projecting toward an other opposing surface of the pair of gripping parts on at least one opposing surface of the pair of gripping parts;

gripping the ranges in proximity to the rubber sheet members, respectively, in a state in which the end surfaces project from the one opposing surface toward the other opposing surface of the pair of gripping parts, respectively;

setting a total end surface projection amount of the end surfaces from the opposing surfaces, respectively, to be larger by a predetermined length than a separation distance between the opposing surfaces when the contact member is in a state of being sandwiched between the opposing surfaces; and stopping movement of the pair of gripping parts in proximity to each other by bringing the pair of gripping parts in close proximity to each other in a state in which the contact member is sandwiched between the opposing surfaces.

According to the present technology, by bringing the pair of gripping parts in close proximity to each other and sandwiching contact members between opposing surfaces, movement of the pair of gripping parts in proximity to each other is stopped, so it is possible to bring the gripping parts in close proximity to each other together more quickly. Then, ranges in proximity to the rubber sheet members, in a state in which the end surfaces project from the one opposing surface toward the other opposing surface of the pair of gripping parts, respectively, are gripped; and by setting the total end surface projection amount from the respective opposing surfaces of the respective end surfaces to be a predetermined length longer than a separation distance between the opposing surfaces when the contact members are sandwiched between the opposing surfaces, each end surface may be accurately and quickly positioned at a predetermined position and efficiently joined.

DETAILED DESCRIPTION

Figure 1:
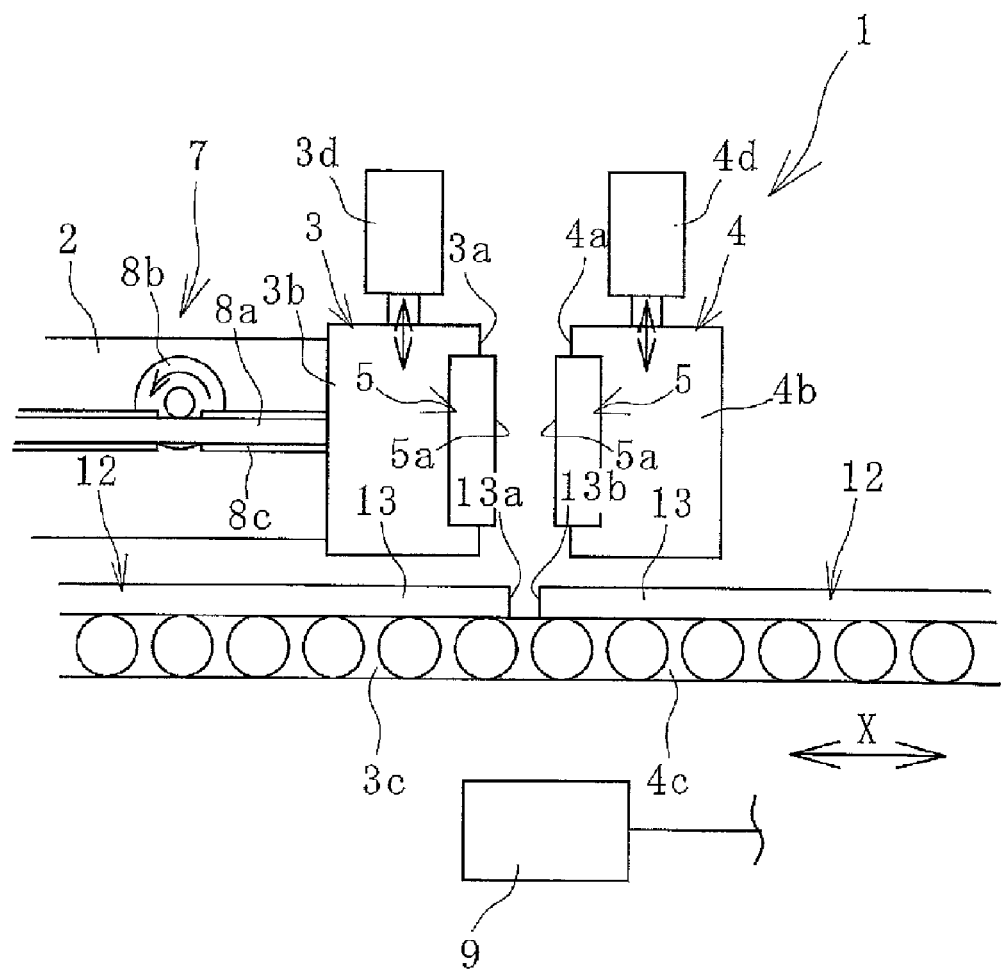
FIG. 1 is an explanatory diagram illustrating, in a longitudinal cross-sectional view, gripping parts of an embodiment of a rubber sheet member joining device according to the present technology.

Hereinafter, the rubber sheet member joining device and method of the present technology will be described in detail based on the embodiments illustrated in the drawings.

Figure 2:
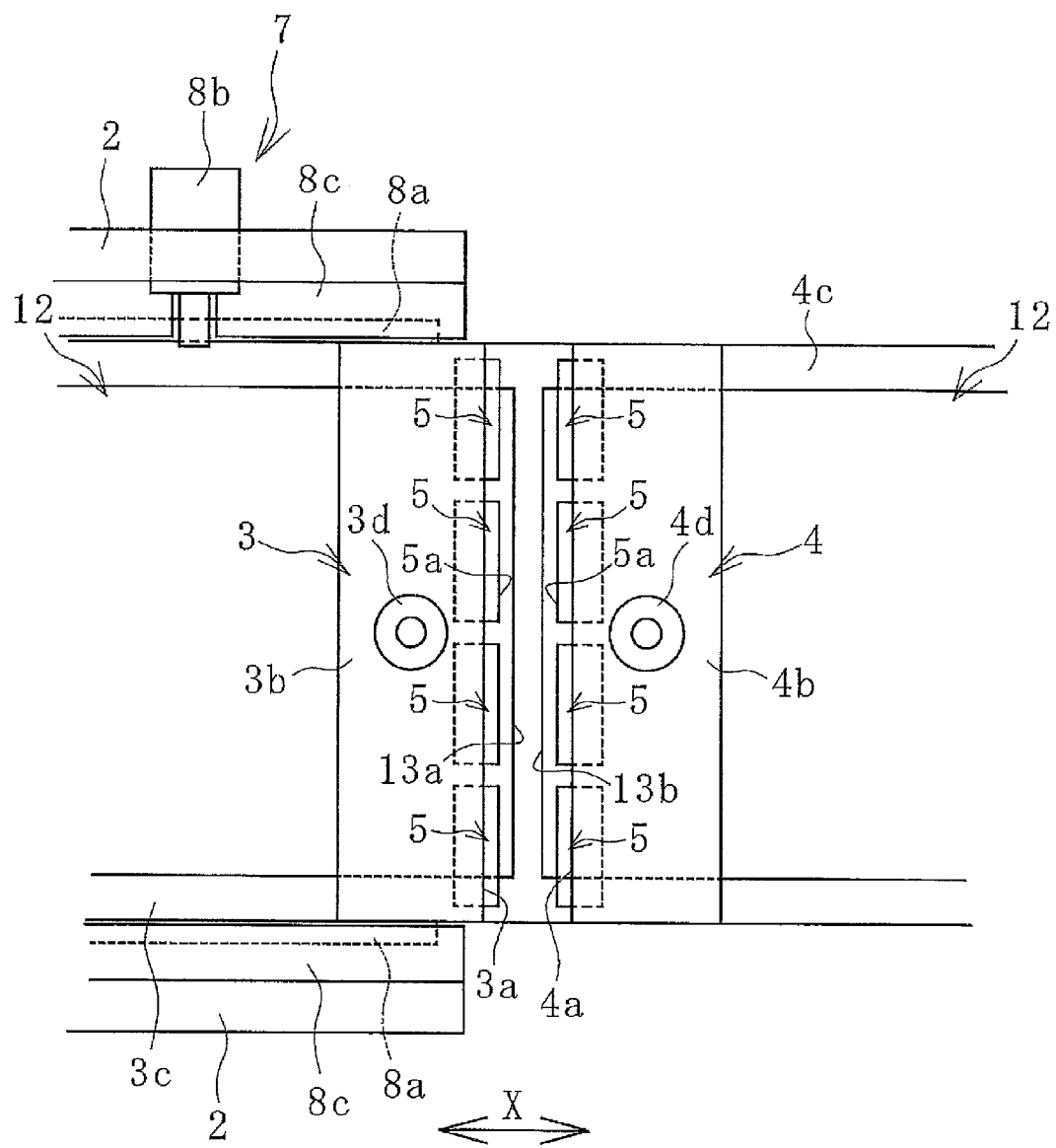
FIG. 2 is an explanatory diagram illustrating the gripping parts in FIG. 1 in a plan view.

In an embodiment of a joining device 1 for rubber sheet members of the present technology illustrated in FIGS. 1 and 2, end surfaces 13a, 13b to be joined, of unvulcanized rubber sheet members 12, are brought in contact and joined together. There are cases in which the end surfaces 13a, 13b of the different rubber sheet members 12 are joined together, and there are cases in which one end and the other end of the same rubber sheet members 12 are joined together. The rubber sheet members 12 are members made of only unvulcanized rubber such as tread rubber, side rubber, or the like or are members made of unvulcanized rubber and a reinforcing material (fiber, steel cord, or the like) embedded in the unvulcanized rubber such as carcass material, a belt member, or the like.

The joining device 1 includes: a pair of gripping parts 3, 4 for gripping a range in proximity to each of the end surfaces 13a, 13b to be joined with the rubber sheet members 12 (in other words, end portions 13 of the rubber sheet members 12); a drive unit 7 that moves at least one of the pair of gripping parts 3, 4 in a direction approaching or separating from each other (hereinafter, also referred to as a front-rear direction X); and a control unit 9 that controls operation of the pair of gripping parts 3, 4 or operation of the drive unit 7. In this embodiment, the one gripping part 3 is moved in a direction approaching or separating from the other gripping part 4 in a stationary state in the front-rear direction X; however, a configuration is also possible in which the other gripping part 4 is moved in a direction approaching or separating from the one gripping part 3 in a stationary state in the front-rear direction X, or in which both gripping parts 3, 4 are moved in a direction approaching or separating from each other.

The drive unit 7 includes: a sliding portion 8a provided on a side surface of the gripping part 3; a motor 8b that engages with the sliding portion 8a and moves the sliding portion 8a in the front-rear direction X; and a movement guide 8c attached to a frame 2. The movement guide 8c extends in the front-rear direction X. By driving the motor 8b to move the sliding portion 8a while guiding the movement thereof by the movement guide 8c, the gripping part 3 moves in the extending direction (front-rear direction X) of the movement guide 8c. A computer or the like is used as the control unit 9. An actuator such as a fluid cylinder or the like may be used as the drive unit 7.

In this embodiment, each of the gripping parts 3, 4 has the same structure, so only the one gripping part 3 will be described as a representative. The gripping part 3 includes: a pair of upper and lower gripping pieces 3b, 3c; and an opening/closing drive unit 3d for moving the one gripping piece 3b in a direction approaching or separating from the other gripping piece 3c in a stationary state. In this embodiment, a roller conveyor in which a large number of rotatable rollers are disposed at intervals in the front-rear direction X is used as the other gripping piece 3c. This roller conveyor also functions as an other gripping piece 4c of the other gripping part 4.

An actuator such as a fluid cylinder or the like may be used as the opening/closing drive unit 3d. By controlling the opening/closing drive unit 3d by the control unit 9, the gripping piece 3b closes when brought in proximity to the gripping piece 3c, and the gripping piece 3b opens when separated from the gripping piece 3c. Configuration is also possible in which the other gripping piece 3c is moved in a direction approaching or separating from the one gripping piece 3b in a stationary state, or in which both gripping pieces 3b, 3c are moved in a direction approaching or separating from each other.

A contact member 5 is provided on opposing surfaces 3a, 4a of the respective gripping parts 3, 4. Each contact member 5 has a contact surface 5a projecting from one of the opposing surfaces 3a, 4a toward the other of the opposing surfaces 4a, 3a. The contact member 5 may be provided on at least one of the opposing surfaces 3a, 4a of the pair of gripping parts 3, 4.

Figure 3:
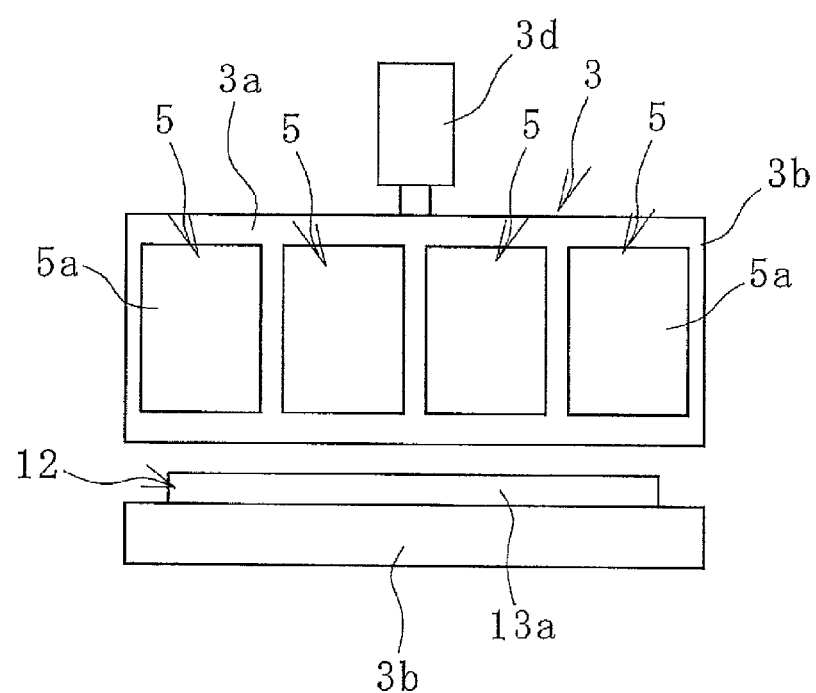
FIG. 3 is an explanatory diagram illustrating one gripping part in a front view.

In this embodiment, as illustrated in FIG. 3, a plurality of the plate-shaped contact members 5 having the rectangular contact surface 5a are mounted side by side on the gripping piece 3b having the rectangular opposing surface 3a. Each contact member 5 may be attached to or detached from the opposing surface 3a to be mounted by screws or the like. Similarly, the plurality of plate-shaped contact members 5 having the rectangular contact surface 5a are mounted side by side on the gripping pieces 4b having the rectangular opposing surface 4a. Each contact member 5 may be attached to or detached from the opposing surface 4a to be mounted by screws or the like. The shape of the contact surface 5a in a front view is not limited to being a rectangle, and various shapes such as a circle, an ellipse, or the like may be adopted.

When the pair of gripping parts 3, 4 come close to each other, the contact surfaces 5a of the respective contact members 5 come in contact with each other. Therefore, it is preferable to use a material having excellent impact resistance for the contact members 5 (contact surfaces 5a). As will be described later, since each of the contact members 5 slides in a state in which the contact surfaces 5a are in contact with each other, it is desirable for the contact surfaces 5a to have a small kinetic friction coefficient. For example, the contact surfaces 5a preferably have a lower kinetic friction coefficient than the opposing surfaces 3a, 4a. More specifically, as the contact members 5, a low friction material such as a resin having excellent lubricating properties (fluororesin, nylon resin, polyacetal resin, ultra high molecular weight polyethylene, and the like) or a metal or the like having lubricating properties corresponding to these may be adopted, or a lubricating treatment such as fluororesin surface treatment may be preferably performed on the contact surfaces $5a$. In a case where the kinetic friction coefficient is small in this way, it is configured that lubricating oil is not used in order that the adhesiveness (the adhesiveness of the unvulcanized rubber) between the end surfaces $13a$, $13b$ is not reduced. In addition, in order to avoid excessive surface pressure of the contact surfaces $5a$ that are in contact, the surface area of one contact surface $5a$ is, for example, 2000 $mm^2$ or greater.

Next, an example of a procedure for joining the end surfaces $13a$, $13b$ to each other will be described.

Figure 4:
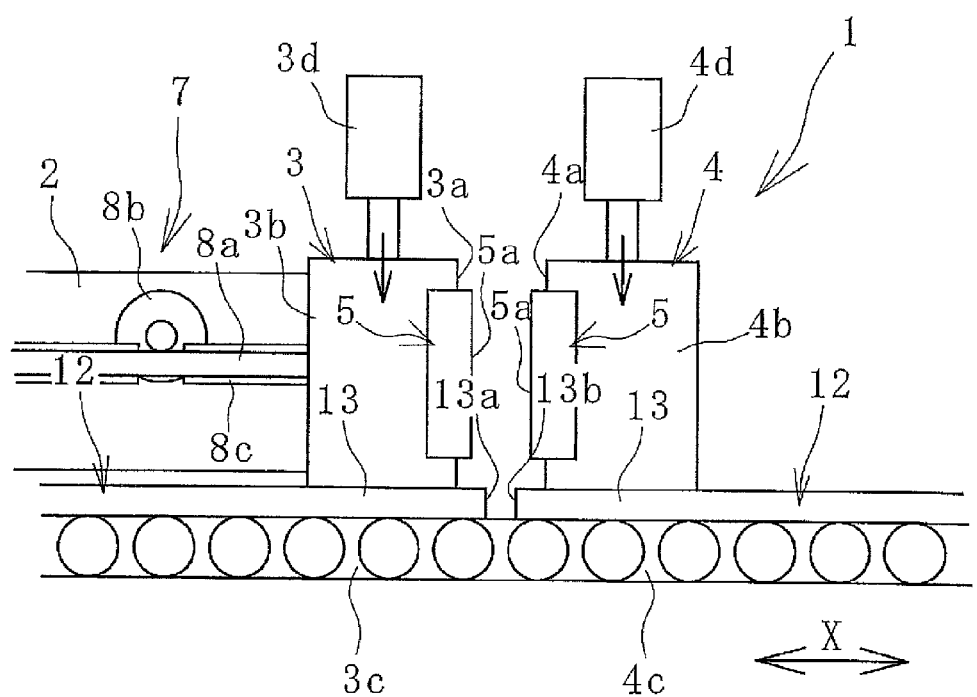
FIG. 4 is an explanatory diagram illustrating, in a longitudinal cross-sectional view, a state in which the end portions of the rubber sheet members in FIG. 1 are gripped by the respective gripping parts.

As illustrated in FIG. 1, each of the rubber sheet members 12 to be joined are disposed on the gripping pieces $3c$, $4c$. Next, as illustrated in FIG. 4, by bringing the gripping pieces $3b$, $4b$ in close proximity to the opposing gripping pieces $3c$, $4c$, respectively, and by closing the gripping parts 3, 4, the respective end portions 13, 13 of the rubber sheet members 12 are gripped by the gripping parts 3, 4.

When gripping the one end portion 13 by the one gripping part 3, the end surface $13a$ is gripped in a state in which the end surface $13a$ projects from the opposing surface $3a$ of the one gripping part 3 toward the opposing surface $4a$ of the other gripping part 4. Similarly, when gripping the other end portion 13 by the other gripping part 4, the end surface $13b$ is gripped in a state in which the end surface $13b$ projects from the opposing surface $4a$ of the other gripping part 4 toward the opposing surface $3a$ of the one gripping part 3.

Figure 5:
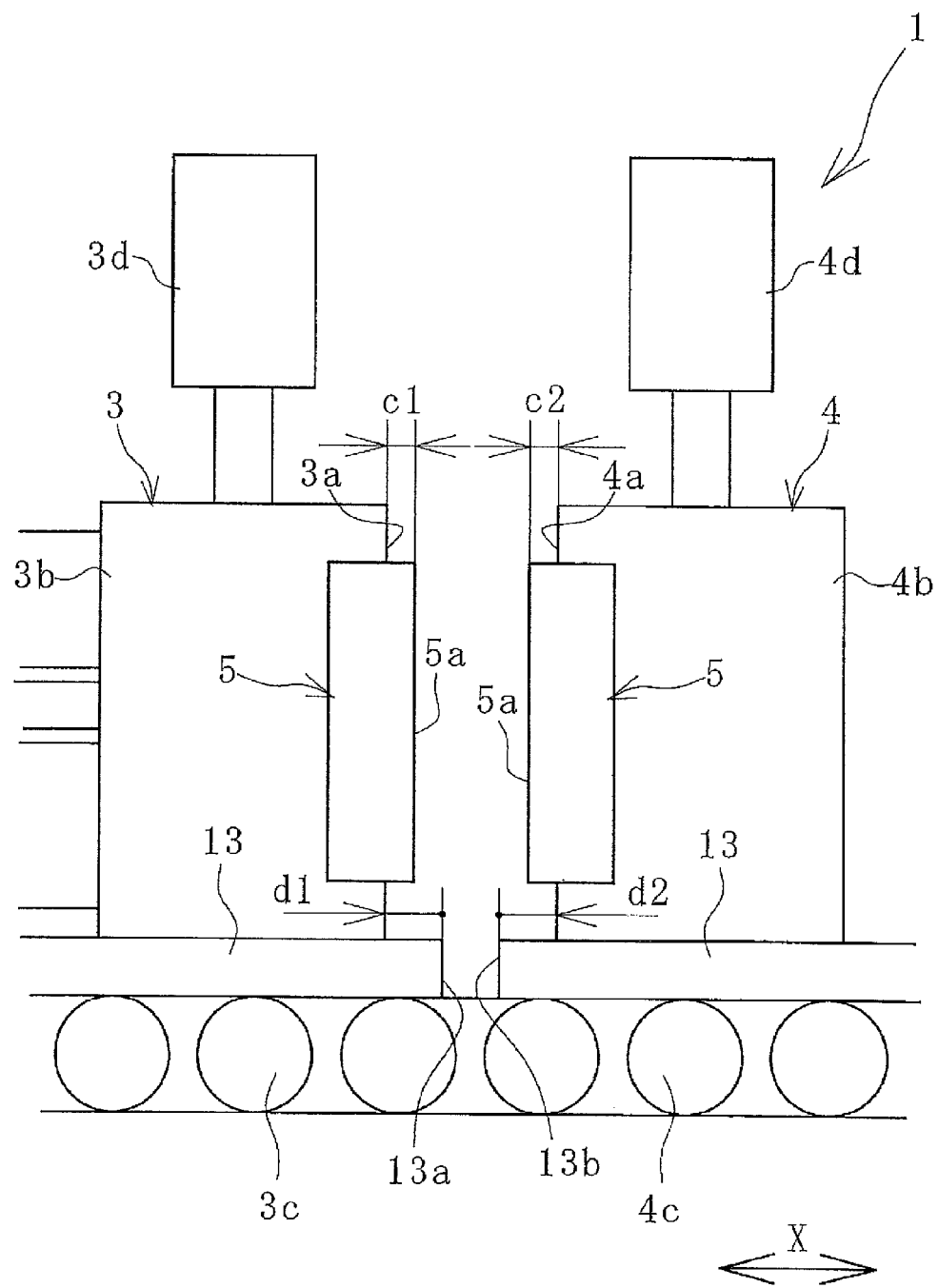
FIG. 5 is a partial enlarged view of FIG. 4.

At this time, as illustrated in FIG. 5, the sum of an end surface projection amount d1 of the end surface $13a$ from the opposing surface $3a$ and an end face projection amount d2 of the end surface $13b$ from the opposing surface $4a$ (total end surface projection amount d=d1+d2) is set to be larger than a separation distance L between the opposing surfaces $3a$, $4a$ in a state in which the contact members 5 are sandwiched between the opposing surfaces $3a$, $4a$ by a predetermined length B (d=L+B). The total of contact surface projection amounts c1, c2 in the front-rear direction X from the opposing surfaces $3a$, $4a$ of the respective contact surfaces $5a$, $5a$ is the separation distance L (L=c1+c2).

The predetermined length B serves as a butting margin when the end surfaces $13a$, $13b$ are joined together. The appropriate predetermined length B varies depending on the specifications of the rubber sheet members 12, but is, for example, from 0.6 to 0.9 times a total end surface projection amount d.

Figure 6:
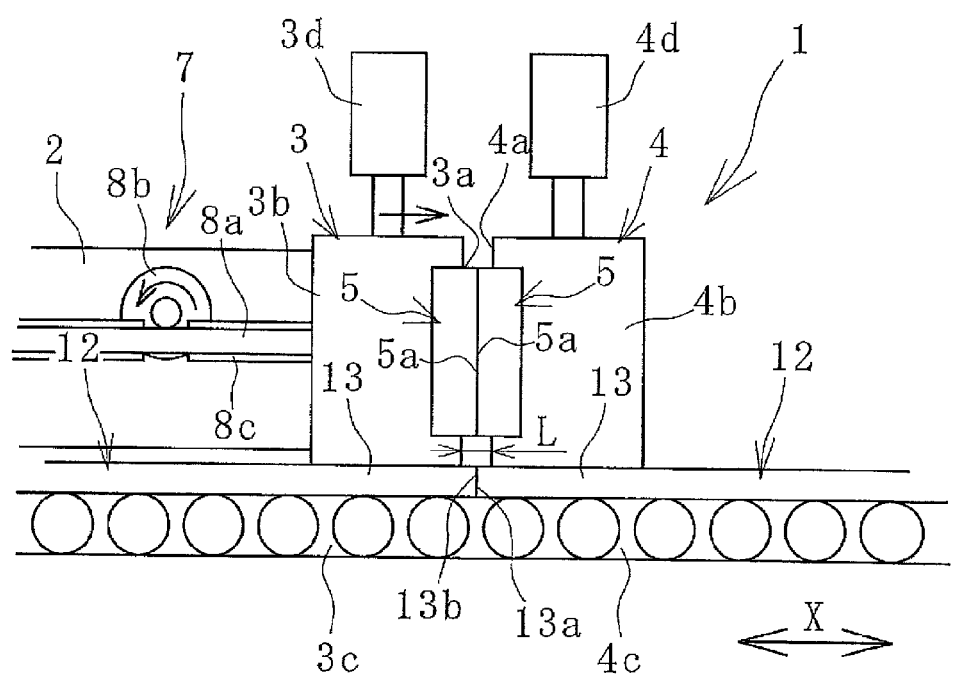
FIG. 6 is an explanatory diagram illustrating, in a longitudinal cross-sectional view, a state in which the end surfaces of the rubber sheet members in FIG. 4 are joined together.

Next, as illustrated in FIG. 6, the drive unit 7 is operated by the control of the control unit 9 to move the one gripping part 3 toward the other gripping part 4. The movement of the gripping part 3 causes the contact surfaces $5a$ of the respective contact members 5 to collide and come in contact with each other. In other words, by bringing the pair of gripping parts 3, 4 in close proximity to each other in a state in which the contact members 5 are sandwiched between the opposing surfaces $3a$, $4a$, the movement of the pair of gripping parts 3, 4 toward each other is stopped.

The sum of the end surface projection amounts d1, d2 from the respective opposing surfaces $3a$, $4a$, of the respective end surfaces $13a$, $13b$ (total end surface projection amount d) is set to be larger than the above-described separation distance L (L=c1+c2) by the predetermined length B. Therefore, as illustrated in FIG. 6, the end surfaces $13a$, $13b$ are joined together in a state of being abutted against each other.

Figure 7:
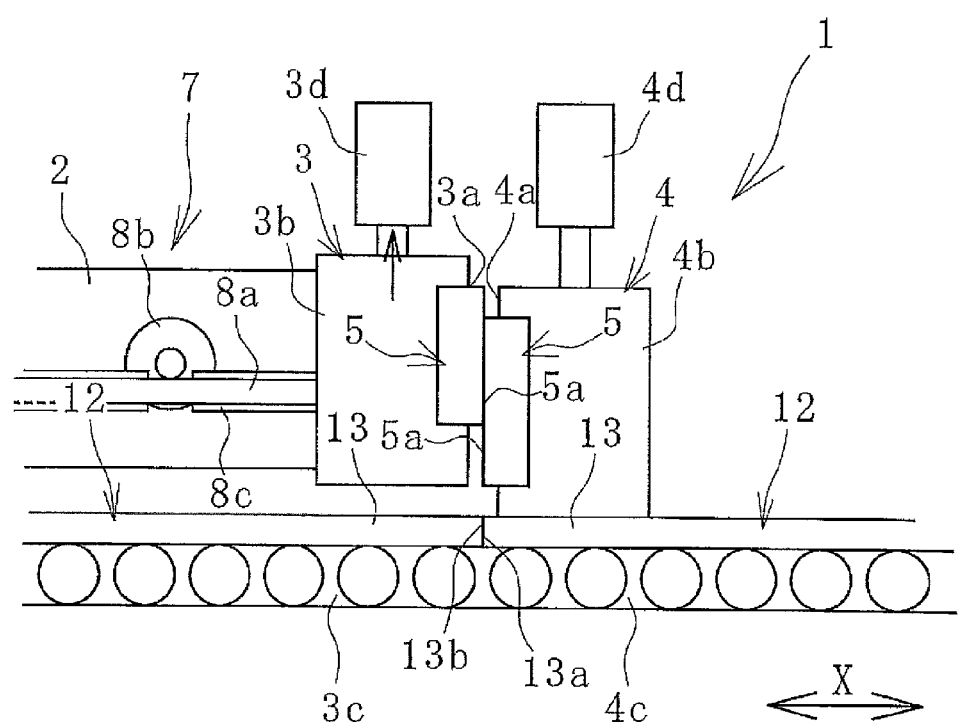
FIG. 7 is an explanatory diagram illustrating, in a longitudinal cross-sectional view, a state in which the grip on one end portion of the rubber sheet member in FIG. 6 by the gripping part is released.

Next, as illustrated in FIG. 7, the gripping pieces $3b$, $4b$ are separated from the gripping pieces $3c$, $4c$ to open the gripping parts 3, 4. As a result, the grip on the respective end portions 13, 13 by the gripping parts 3, 4 is released. Either one of the gripping parts 3, 4 may be opened first, and in this case, since the contact members 5 slides in a state in which the contact surfaces $5a$ are in contact with each other, it is desirable that the contact surfaces $5a$ have a small kinetic friction coefficient.

By the series of steps described above, joining of the end surfaces $13a$, $13b$ is completed. The same process is performed by sequentially gripping the ranges in proximity to the end surfaces $13a$, $13b$ to be joined (end portions 13, 13) by the gripping parts 3, 4. According to the present technology, movement of the pair of gripping parts 3, 4 toward each other is stopped by bringing the pair of gripping parts 3, 4 in close proximity to each other in a state in which the contact members 5 are sandwiched between the opposing surfaces $3a$, $4a$, and therefore the pair of gripping parts 3, 4 (end surfaces $13a$, $13b$) may be brought close to each other more quickly. Since the contact members 5 are in surface contact via the contact surfaces $5a$, they are less likely to be damaged even in the case of colliding at a somewhat high speed.

Since the one gripping part 3 is controlled by the control unit 9 and moves in proximity to the other gripping part 4, the end surfaces $13a$, $13b$ may be accurately and quickly positioned at predetermined positions. Accordingly, the end surfaces $13a$, $13b$ may be joined with high accuracy and in a shorter time than was done in the related art.

In this embodiment, since the contact members 5 may be freely attached to or detached from the gripping parts 3, 4, the contact members 5 may be easily replaced in a case of wear due to usage over time. Since the degree of wear of the contact members 5 varies depending on the positions where the contact members 5 are disposed, in this embodiment, it is possible, according to the degree of wear, to replace only the contact member 5 that requires replacement.

In addition, by selecting contact members 5 having appropriate specifications (dimensions in the front-rear direction X are different) according to the specifications of the rubber sheet members 12 to be joined, the contact surface projection amounts c1, c2 of the contact surfaces $5a$ of the respective contact members 5 may be changed. Along with this, it becomes easy to set the separation distance L described above to a target value.

Figure 8:
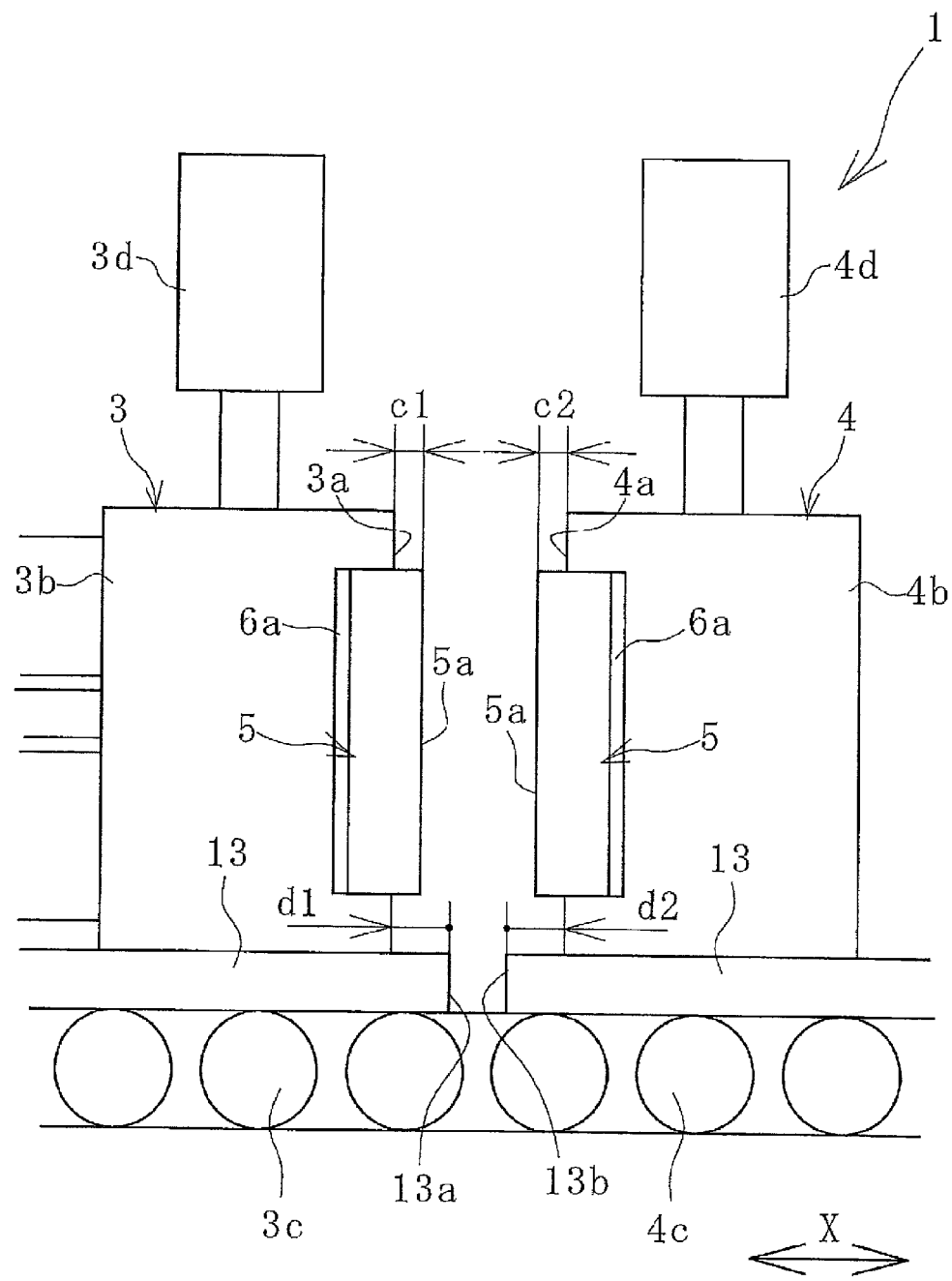
FIG. 8 is explanatory diagram illustrating, in a longitudinal cross-sectional view, gripping parts of another embodiment of a joining device.

As in the embodiment illustrated in FIG. 8, adjustment mechanisms $6a$ for adjusting the contact surface projection amounts c1, c2 may be provided. The adjustment mechanisms $6a$ of this embodiment are shims disposed in recesses formed in the opposing surfaces $3a$, $4a$. A plurality of the shims $6a$ having different thicknesses are prepared, and the contact members 5 together with the shims $6a$ having an appropriate thickness selected from the above are mounted in the recesses of the opposing surfaces $3a$, $4a$. Thereby, the contact surface projection amounts c1, c2 of the respective contact members 5 may be adjusted.

Figure 9:
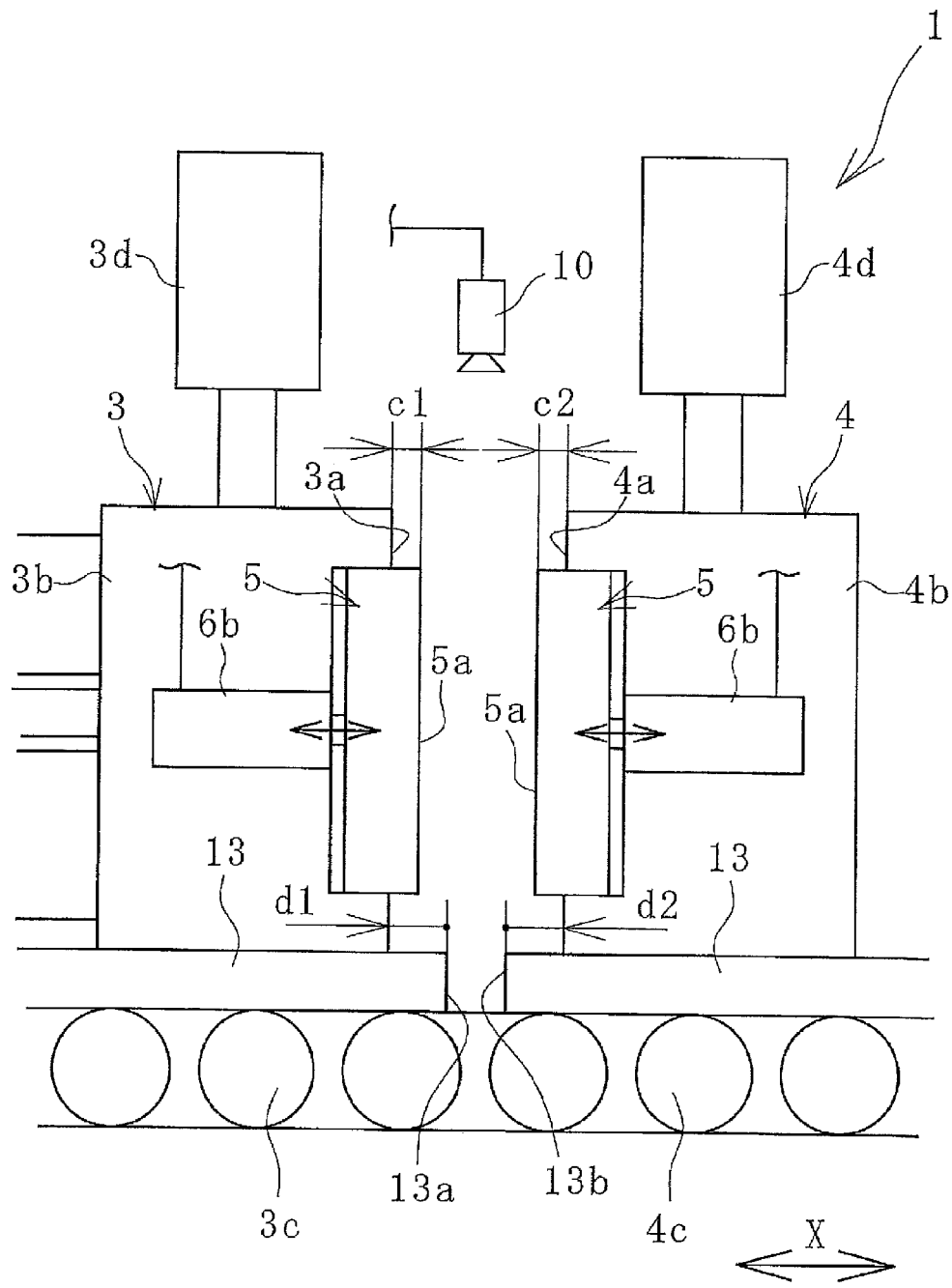
FIG. 9 is an explanatory diagram illustrating a modified example of an adjustment mechanism in FIG. 8.

Alternatively, as illustrated in FIG. 9, actuators installed on the gripping parts 3, 4 may be used as adjustment mechanisms $6b$. By moving each contact member 5 in the front-rear direction X by these actuators $6b$, the contact surface projection amounts c1, c2 may be adjusted. The operation of the actuators $6b$ may be controlled by the control unit 9 or a dedicated control unit.

In a case in which such an actuator $6b$ is used, a projection amount sensor 10 for detecting the contact surface projection amounts c1, c2 may be provided. The positions of the contact members 5 in the front-rear direction X are configured to be adjusted by the actuators 6b so that the contact surface projection amounts c1, c2 detected by the projection amount sensor 10 are within a preset target range. Accordingly, even in a case in which the contact members 5 (contact surfaces 5a) are worn, the contact surface projection amounts c1, c2 may be maintained within the target range.

Figure 10:
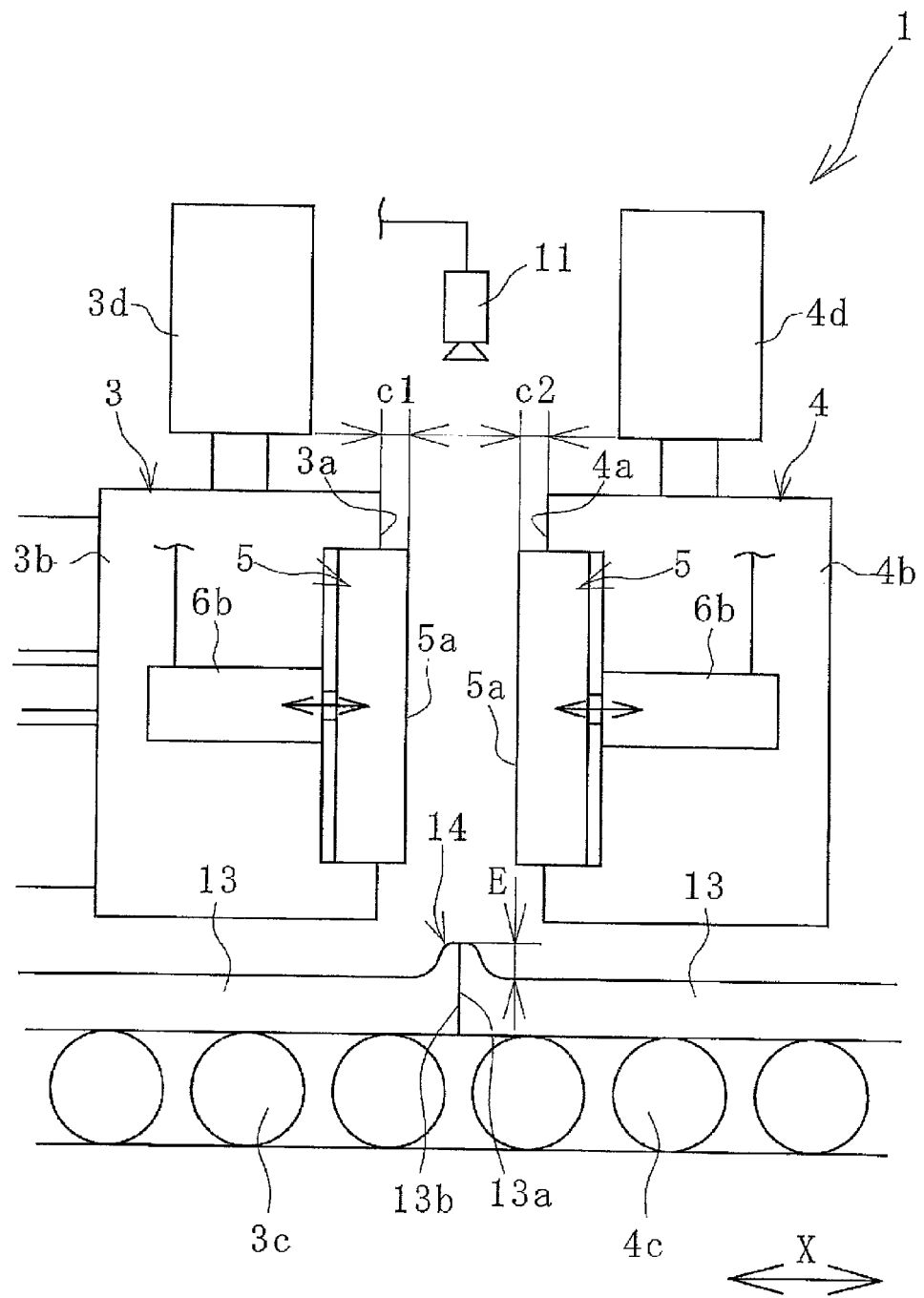
FIG. 10 is an explanatory diagram illustrating, in a vertical cross-sectional view, gripping parts of still another embodiment of a joining device.

The embodiment illustrated in FIG. 10 includes a state sensor 11 that determines the state of a joint portion 14 where the end surfaces 13a, 13b are joined. As the state sensor 11, a camera device, a displacement sensor, or the like that acquires image data of the joint portion 14 may be used. The state sensor 11 calculates a projection amount E in a thickness direction from a peripheral portion of the joint portion 14 based on the detected data. In a case where a butting margin B is too large, the projection amount E may exceed the permissible range because the joint portion 14 bulges excessively.

Therefore, the actuator 6b is controlled by the control unit 9, based on the projection amount E calculated using the detection data of the state sensor 11, and the positions of the contact members 5 in the front-rear direction X are adjusted so that the projection amount E in the thickness direction of the joint portion 14 between the end surfaces 13a, 13b to be joined next is within a preset permissible range. This is advantageous for avoiding a defective joint between the end surfaces 13a, 13b.

The invention claimed is:

1. A rubber sheet member joining device, comprising:
a pair of gripping parts for gripping, respectively, end portions in proximity to end surfaces of rubber sheet members to be joined, the rubber sheet members being unvulcanized;
a drive unit that moves at least one of the pair of gripping parts in a direction approaching and separating from each other; and
a control unit for controlling operation of the pair of gripping parts and operation of the drive unit,
the rubber sheet member joining device being configured such that:
one opposing surface of each gripping part of the pair of gripping parts comprises a contact member with a contact surface projecting toward an other opposing surface of the pair of gripping parts;
when the pair of gripping parts are in close proximity to each other, the contact member is in a state of being sandwiched between the opposing surfaces and in which the contact surface of one of the contact members is in contact with the contact surface of an other one of the contact members, and movement of the pair of gripping parts in proximity to each other is stopped;
the end portions in proximity to the end surfaces of the rubber sheet members are gripped, respectively, in a state in which the end surfaces project from the one opposing surface and project beyond the contact surface toward the other opposing surface of the pair of gripping parts, respectively; and
a total end surface projection amount of the end surfaces from the opposing surfaces, respectively, is set to be larger by a predetermined length than a separation distance between the opposing surfaces when the contact member is in a state of being sandwiched between the opposing surfaces and movement in proximity to each other is stopped.

2. The rubber sheet member joining device according to claim 1, wherein
the contact members are provided, respectively, on the opposing surfaces to be attachable or detachable, and
when the pair of gripping parts come in close proximity to each other, the contact members are configured to come into contact with each other to stop movement of the pair of gripping parts in proximity to each other.

3. The rubber sheet member joining device according to claim 2, wherein the contact members are attachable to and detachable from the pair of gripping parts comprising the contact members.

4. The rubber sheet member joining device according to claim 3, wherein
the contact surface has a lower kinetic friction coefficient than the opposing surface, and
no lubricating oil is used.

5. The rubber sheet member joining device according to claim 4, further comprising an adjustment mechanism for adjusting a contact surface projection amount of the contact surface of the contact member that is gripped by the pair of gripping parts, respectively, from the opposing surface of the pair of gripping parts.

6. The rubber sheet member joining device according to claim 1, wherein the contact members are attachable to and detachable from the pair of gripping parts comprising the contact members.

7. The rubber sheet member joining device according to claim 1, wherein
the contact surface has a lower kinetic friction coefficient than the opposing surface, and
no lubricating oil is used.

8. The rubber sheet member joining device according to claim 1, further comprising an adjustment mechanism for adjusting a contact surface projection amount of the contact surface of the contact member that is gripped by the pair of gripping parts, respectively, from the opposing surface of the pair of gripping parts.

9. The rubber sheet member joining device according to claim 8, further comprising a projection amount sensor configured to detect the contact surface projection amount, wherein a position of the contact member is configured to be adjusted by the adjustment mechanism such that the contact surface projection amount detected by the projection amount sensor is within a preset target range.

10. The rubber sheet member joining device according to claim 8, further comprising a state sensor that determines a state of a joint portion where the end surfaces are joined together, respectively, wherein
a projection amount in a thickness direction of the joint portion is calculated based on data determined by the state sensor; and
a position of the contact member is configured to be adjusted by the adjustment mechanism so that the projection amount in the thickness direction of the joint portion between the end surfaces to be joined next is within a preset permissible range.

11. A rubber member joining method for joining end surfaces of rubber sheet members by gripping, respectively, end portions in proximity to end surfaces of the rubber sheet members to be joined by a pair of gripping parts, the rubber sheet members being unvulcanized, and by moving at least one of the pair of gripping parts in a direction approaching each other;
the rubber member joining method comprising steps of:
installing a contact member having a contact surface projecting toward an other opposing surface of the pair of gripping parts on one opposing surface of each gripping part of the pair of gripping parts;

gripping the end portions in proximity to the end surfaces of the rubber sheet members, respectively, in a state in which the end surfaces project from the one opposing surface and project beyond the contact surface toward the other opposing surface of the pair of gripping parts, respectively;

setting a total end surface projection amount of the end surfaces from the opposing surfaces, respectively, to be larger by a predetermined length than a separation distance between the opposing surfaces when the contact member is in a state of being sandwiched between the opposing surfaces; and stopping movement of the pair of gripping parts in proximity to each other by bringing the pair of gripping parts in close proximity to each other in a state in which the contact member is sandwiched between the opposing surfaces and in which the contact surface of one of the contact members is in contact with the contact surface of an other one of the contact members.

* * * * *